No. 845,195. PATENTED FEB. 26, 1907.
G. H. ROBBINS.
CABBAGE HARVESTER.
APPLICATION FILED MAY 28, 1906.

UNITED STATES PATENT OFFICE.

GEORGE H. ROBBINS, OF RACINE, WISCONSIN.

CABBAGE-HARVESTER.

No. 845,195.     Specification of Letters Patent.     Patented Feb. 26, 1907.

Application filed May 28, 1906. Serial No. 319,002.

*To all whom it may concern:*

Be it known that I, GEORGE H. ROBBINS, a citizen of the United States, and a resident of Racine, in the county of Racine and State of Wisconsin, have invented certain new and useful Improvements in Cabbage-Harvesters; and I do hereby declare that the following is a full, clear, and exact description thereof.

My invention consists in what is herein shown, described, and claimed, its object being to save time and labor, and thereby facilitate the harvesting of cabbage by providing an implement that combines the function of a stalk-cutter and loading-fork.

Figure 1:
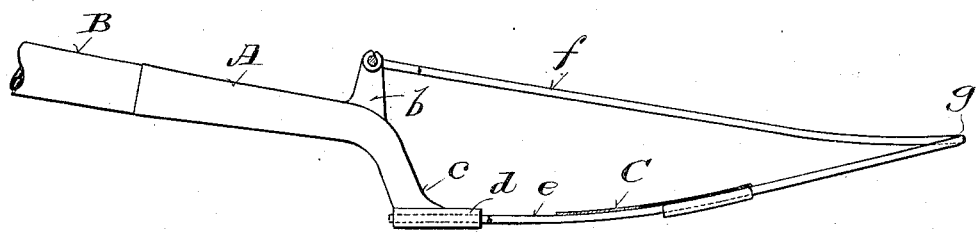
Figure 2:
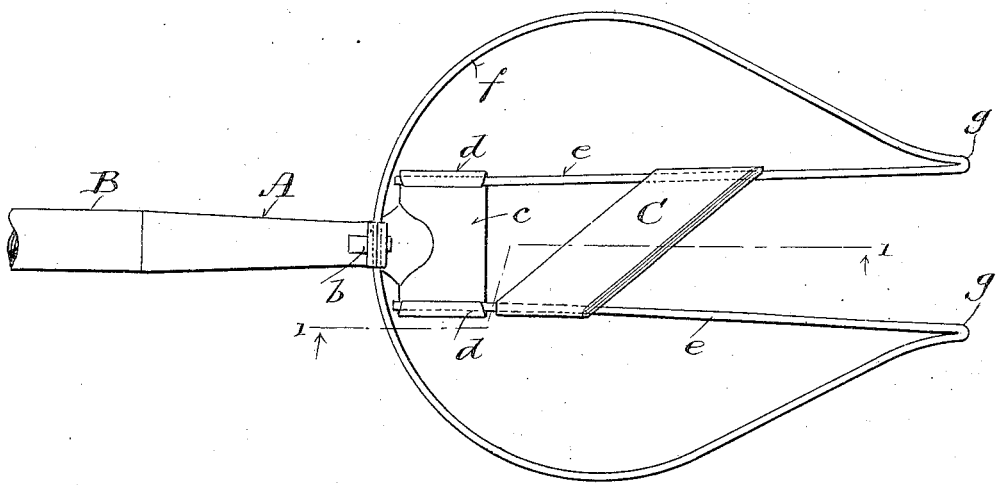

Figure 1 of the accompanying drawings represents an elevation of a cabbage-harvester in accordance with my invention, partly in section, as indicated by lines 1 1 in Fig. 2, and having part of its handle broken away; and Fig. 2, a plan view of the harvester having part of its handle broken away.

Referring by letter to the drawings, A indicates a crooked cross-head shank in which a handle B, similar to that of a shovel or pitchfork, is secured, and said shank is provided with an upper T-lug $b$ adjacent to its crook. The dropped cross-head $c$ of the shank is provided with side sockets $d$, and rigidly secured in these sockets are the ends of a wire that is bent to form a forked cradle, comprising tines $e$, outwardly divergent from said cross-head, and a laterally-spread and bowed rim $f$, rising from the outer ends of the tines, the bow of this rim being caught and supported in the shank-lug $b$ aforesaid, there being a divergence of said rim backward from said tines. The bends of the wire at the junctions of the tines $e$ and the termini of the rim $f$ form blunt points $g$, having the function hereinafter set forth.

The above-described shank is preferably a malleable casting, the side sockets $d$ of its cross-head and the head of its T-lug being originally open, but finally closed to bind the tines $e$ and rim $f$ of the aforesaid cradle in place. By means of the lug $b$ economical provision is had for obtaining a desirable depth at the rear of the aforesaid cradle; but the same result could be obtained, but at a greater expenditure of metal, by a greater drop of the downturned cross-head end of the aforesaid shank, the rim of said cradle being fastened or otherwise upon said shank.

Secured in connection with the tines $e$ of the cradle, immediately forward of the cross-head $c$ of the shank A, is a preferably diagonal blade C, the edge of the same being toward the front. The blade is herein shown as being of sheet-steel, bent at its ends fast on the tines of the aforesaid cradle; but it may be variously fashioned and secured to said tines.

In practice the harvester is manipulated by hand to have the tines $e$ of its cradle portion straddle the stalk of a cabbage, the blunt points $g$ of said cradle serving to part the lower undesirable leaves of said cabbage, and by a forward pushing motion of said harvester the blade C thereof is caused to sever said stalk by a shear cut, the cabbage-head being caught in the aforesaid cradle, to be tossed into a wagon or other conveyance accompanying the operator. Owing to the shearing action of the aforesaid blade the cabbage-stalk is cut without inclining of itself and the cabbage-head under the pushing force exerted upon the harvester.

By the employment of a harvester such as I have shown and described much of the time and labor ordinarily required to cut cabbage in the field with a common knife, lay the cabbage-heads in rows, and thereafter gather said heads into a conveyance is saved, while at the same time tiresome stooping of the operator and coming into contact with wet cabbage is avoided.

I claim—

1. A cabbage-harvester comprising a shank attachable to a handle and having a downturned forward cross-head end provided with side sockets, a bent-wire cradle having fork-tines thereof caught in the sockets, a portion of the cradle being a rearwardly-diverging gradually-rising rim supported on said shank; and a blade arranged in connection with the tines aforesaid.

2. A cabbage-harvester comprising a shank attachable to a handle and having a downturned forward cross-head end and an upper T-lug adjacent to its crook, a bent-wire cradle having fork-tines thereof in rigid connection with the shank cross-head a portion of the cradle being a rearwardly-diverging bowed rim caught in the head of said lug; and a blade arranged in connection with the tines aforesaid.

3. A cabbage-harvester comprising a shank attachable to a handle, a forked stalk-straddling and head-receiving cradle in connection with the shank, and a blade diagonally arranged in connection with the fork portion of the cradle.

In testimony that I claim the foregoing I have hereunto set my hand, at Racine, in the county of Racine and State of Wisconsin, in the presence of two witnesses.

GEO. H. ROBBINS.

Witnesses:
JOHN WENTWORTH,
CHAS. KRENZKE.